United States Patent

Fukushima

[11] Patent Number: 5,249,659
[45] Date of Patent: Oct. 5, 1993

[54] VISCOUS-FLUID DISC DAMPER

[75] Inventor: Hirotaka Fukushima, Neyagawa, Japan

[73] Assignee: Daikin Clutch Corporation, Osaka, Japan

[21] Appl. No.: 764,855

[22] Filed: Sep. 24, 1991

[30] Foreign Application Priority Data

Oct. 29, 1990 [JP] Japan .................. 2-293322

[51] Int. Cl.$^5$ .................. F16D 3/14; F16D 47/02
[52] U.S. Cl. .................. 192/70.17; 192/106.2; 74/574; 464/24; 464/68
[58] Field of Search .................. 192/70.17, 70.19, 106.1, 192/106.2; 74/574; 464/24, 66, 68

[56] References Cited

U.S. PATENT DOCUMENTS

| | | | |
|---|---|---|---|
| 4,274,524 | 6/1981 | Nakane | 192/48.3 |
| 4,351,167 | 9/1982 | Hanke et al. | 192/106.2 X |
| 4,638,684 | 1/1987 | Maucher | 74/574 |
| 4,714,449 | 12/1987 | Woerner et al. | 192/106.2 X |
| 4,732,250 | 3/1988 | Maucher et al. | 192/70.17 |
| 4,739,866 | 4/1988 | Reik et al. | 192/106.2 X |
| 4,782,718 | 11/1988 | Hartig et al. | 74/574 |
| 4,944,712 | 7/1990 | Wörner et al. | 464/67 |
| 5,030,166 | 7/1991 | Wörner et al. | 464/24 |
| 5,052,978 | 10/1991 | Hanke | 464/24 |
| 5,072,818 | 12/1991 | Kuhne | 192/106.1 |
| 5,088,964 | 2/1992 | Kuhne | 464/68 |
| 5,097,722 | 3/1992 | Fukushima | 74/574 |
| 5,103,688 | 4/1992 | Kuhne | 192/70.17 X |

FOREIGN PATENT DOCUMENTS

0108393A1  5/1984  European Pat. Off.
64-8219  2/1989  Japan.

Primary Examiner—Leslie A. Braun
Assistant Examiner—Andrea Pitts
Attorney, Agent, or Firm—Armstrong, Westerman, Hattori, McLeland & Naugton

[57] ABSTRACT

A viscous-fluid disc damper includes an input-side drive plate having a containing space, an output-side driven plate disposed in the containing space, and a viscous fluid medium damper mechanism arranged between both plates for absorbing torsional torque. The damper mechanism has a fluid housing provided in the peripheral portion of the drive plate and opening radially toward the center, choke projections provided on the periphery of the driven plate which project into the fluid housing, sliders slidably located in the fluid housing and fitted over the choke projection, and choke tabs formed in the fluid housing. The flow passage of the choke tab is smaller than that of the choke projection. The viscous-fluid disc damper can include a fluid storage for compensating fluid within the fluid housing, via a connecting path between the fluid storage and the fluid housing. In the viscous-fluid disc damper, the hysteresis torque at small operating angles is low, due to the low viscous resistance effected while at large operating angles it is high due to the high viscous resistance effected. If some amount of fluid happens to leak from the fluid housing during operation, the loss is compensated by centrifugal force which drives the fluid from the fluid storage through the connecting path into the fluid housing.

42 Claims, 6 Drawing Sheets

VISCOUS-FLUID DISC DAMPER

BACKGROUND OF THE INVENTION

The present invention relates generally to a disc damper. More specifically, it relates to a viscous-fluid disc damper for damping torsional vibrations by virtue of the viscosity of a fluid medium.

A conventional viscous-fluid disc damper includes an output-side driven plate, an input-side drive plate containing the driven plate by enclosing it laterally and along its periphery, and a damper mechanism arranged between both the plates for damping torsional vibrations (see, for example, U.S. Pat. Nos. 4,351,167 and 4,739,866).

A portion of a conventional viscous-fluid disc damper is shown in FIG. 6. Referring to FIG. 6, fluid chambers 61 and 62 contain a fluid medium and are formed in a drive plate 60. A choke 63 is provided between the fluid chambers 61 and 62. The choke 63 is defined by a recession 65 of a driven plate 64 and an inward projection 66 of the drive plate 60.

In order to vary hysteresis torque in, for example, two phases, a channel 67 is formed lengthwise through the middle of the recession 65. In this structure, the clearance of the choke 63 changes from D1 to D2 when the drive plate 60 rotates relative to the driven plate 64 through, for example, an angle $\theta3$ in the direction of rotation R, or an angle of $\theta4$ in the direction opposite that indicated in FIG. 6. Accordingly, the hysteresis torque increases from H3 to H4, as represented by FIG. 7.

The conventional viscous fluid damper disc is so constructed that the hysteresis torque thus varies in direct dependency on changes in torsional angle of the drive plate 60 relative to the driven plate 64. Therefore, although it is occasionally necessary, it is not possible that the hysteresis torque response developed at large-angle torsion be low, nor that the hysteresis torque response developed at small-angle torsion be high.

SUMMARY OF THE INVENTION

An object of the present invention is to provide a viscous-fluid disc damper which effects low viscous resistance at small operating angles and high viscous resistance at large operating angles irrespective of torsional angle.

Another object of the present invention is to provide a viscous-fluid disc damper capable of effectively absorbing both engine combustion vibration and chassis vibration of a motor vehicle.

Still another object of the present invention is to provide a viscous fluid damper disc capable of maintaining its hysteresis torque characteristics and its means of generating hysteresis torque throughout an extended life.

A further object of the present invention is to provide a viscous fluid damper disc capable of automatically supplying fluid to a fluid housing by the centrifugal force developed by the rotation of the damper disc so as to compensate for leakage of fluid out of the fluid housing during its operation.

A viscous fluid damper disc according to the present invention comprises an input-side drive plate having a containing space, an output-side driven plate disposed in the containing space, and a viscous-medium damper mechanism disposed between both the plates for absorbing torsional torque. The viscous-medium damper mechanism has a fluid housing provided in the peripheral portion part of the drive plate and opening radially toward the center, choke projections provided on the periphery of the driven plate which project into the fluid housing, sliders slidably located in the fluid housing and fitted over the choke projection, and choke tabs formed in the fluid housing. The flow passage of the choke tab is smaller than that of the choke projection.

The viscous-fluid disc damper according to the present invention can further include a fluid compensation means having a fluid storage provided radially inwardly of the fluid housing in the disc damper and a connecting path which connects the fluid storage and the fluid housing in order to compensate the fluid within the housing.

In the viscous fluid damper disc of the present invention hysteresis torque varies in dependency not on the torsional angle of the drive plate relative to the driven plate, but on the positional relation between the slider and the choke projection. That is, low hysteresis torque is achieved since low viscous resistance is effected when a small operating angle is results from, for example, combustion vibration; moreover, high hysteresis torque is achieved since high viscous resistance is effected when a large operating angle results from, for example, chassis vibration. Accordingly, the viscous-fluid disc damper effectively absorbs different types of operational vibration, such as combustion vibrations or chassis vibrations.

In a viscous-fluid disc damper having the fluid compensation mechanism or the present invention, if some amount of fluid happens to leak from the fluid housing during operation, the loss is compensated by centrifugal force which drives the fluid from the fluid storage through the connecting path into the fluid housing, thereby preventing degradation of damping characteristics and particularly, hysteresis torque characteristics.

The foregoing and other objects, features, aspects and advantages of the present invention will become more apparent from the following detailed description when taken in conjunction with the accompanying drawings.

DESCRIPTION OF THE PREFERRED EMBODIMENTS

Figure 1:
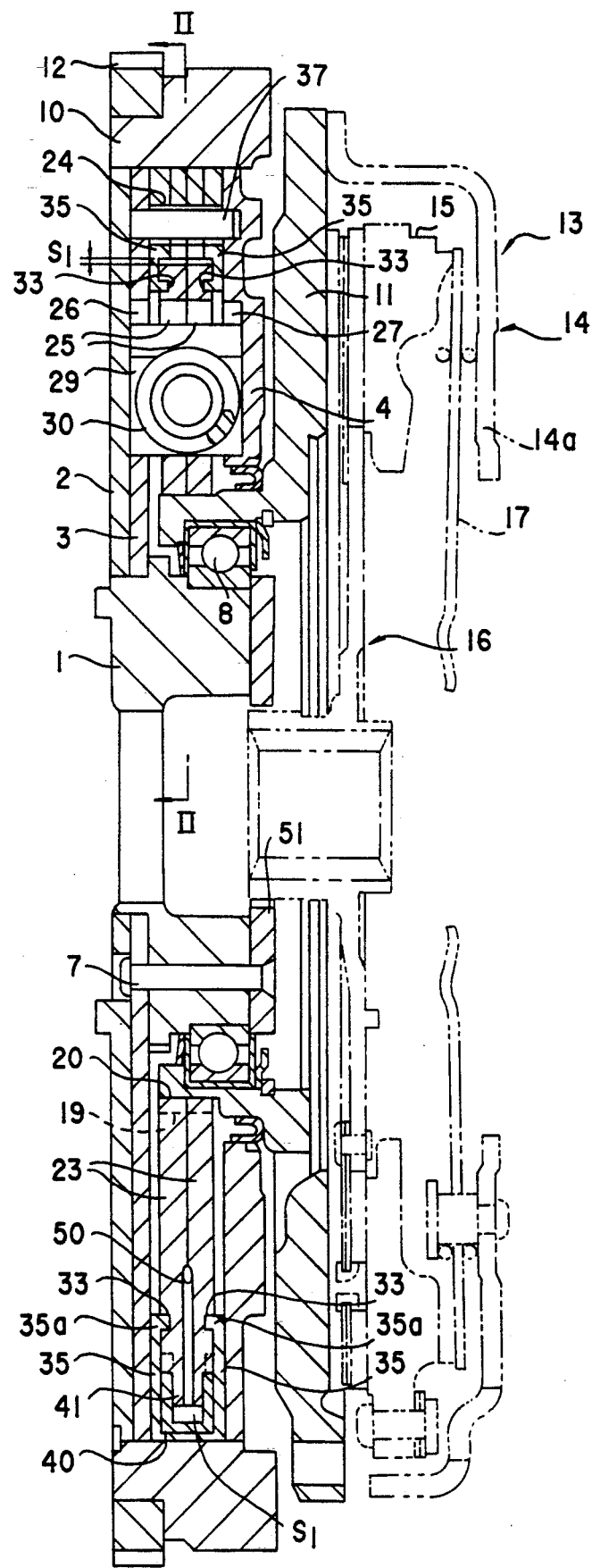
FIG. 1 is a cross sectional view showing a viscous-fluid disc damper according to the present invention, which is taken along the line I—I indicated in FIG. 2.

FIG. 1 shows an embodiment of a viscous-fluid disc damper according to the present invention.

The viscous-fluid disc damper has an input-side hub 1 which may be connected to the crankshaft of a motor vehicle engine. A stopper plate 51 and a drive plate 3 are fixed to the hub 1 by rivets 7, and a cover plate 2 is fixed to the hub 1. A first flywheel 10 having a ring gear 12 is fixed to the periphery of the drive plate 3 and the cover plate 2. An output-side second flywheel 11 is rotatably fitted onto the periphery of the hub 1 through a bearing 8. A clutch 13 may be connected to the end face of the second flywheel 11.

The clutch 13 comprises a clutch cover 14 having a cover 14a fastened to the second flywheel 11, a pressure plate 15, a diaphragm spring 17 and associated components; and a clutch disc 16 located in the clutch cover 14. The clutch disc 16 may be slidably fitted onto a transmission input shaft (not shown).

Figure 2:
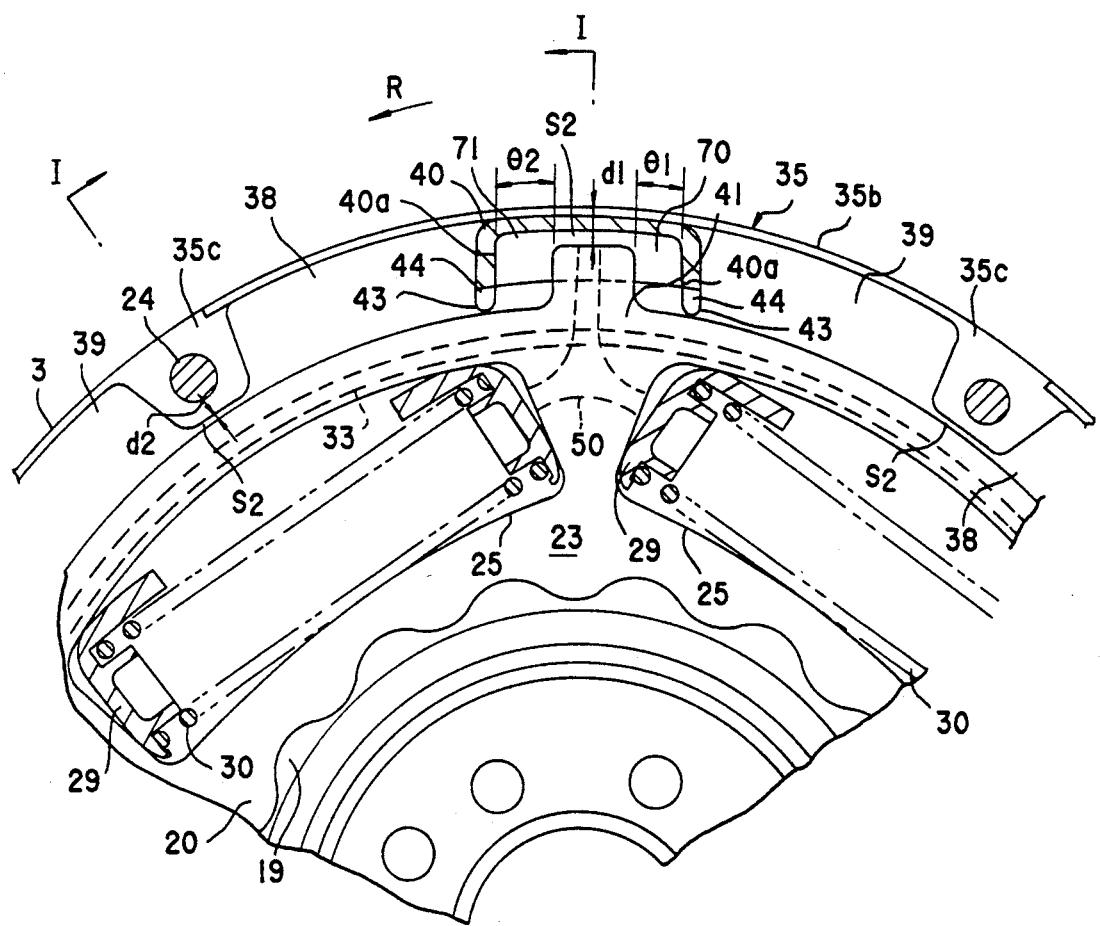
FIG. 2 is a partial sectional view taken along the line II—II indicated in FIG. 1.

Driven plates 23 consisting of a pair of metal plates are arranged between the drive plate 3 and another drive plate 4. The driven plates 23 have serrations 20 engaged by complementary serration 19 formed on the periphery of an axial extension of the second flywheel 11, as shown in FIG. 2. Consequently, the driven plate 23 rotates integrally with the second flywheel 11.

The driven plates 23 have a plurality of apertures 25 sectorially spaced apart from one another. Formed in portions of the drive plates 3 and 4 which correspond to the apertures 25 are apertures 26 and recesses 27. The apertures 26 in the drive plate 3 are closed by the cover plate 2.

Coil springs 30 for receiving torsional torque are so arranged in the apertures 25 and 26 and the recess portions 27 as to be rotationally compressible. As shown in FIG. 2, the coil springs 30 abut against the circumferentially opposing walls of the apertures 25, as well as against the apertures 26 and the recess portions 27, through a spring seat 29. When the disc damper is in a free state, only the radially inward ends of the coil springs 30 abut against the lengthwise-opposing walls of the apertures 25, as shown in FIG. 2. That is, the coil springs 30 contained in the apertures 25 have their ends situated on a bias with respect to the opposing walls of the apertures 25.

An annular fluid housing 35 is sandwiched between the drive plates 3 and 4 on the peripheral surface of the driven plates 23. The fluid housing 35 has a plurality of tabs 35c circumferentially spaced apart from each other, as shown in FIG. 2. The tabs 35c project radially inwards. In addition, the fluid housing 35 is connected to both the drive plates 3 and 4 by pins 37. (See FIG. 3.) Pairs of annular projections 35a project from the radially interior edge of the fluid housing 35. The annular projections 35a are fitted in annular grooves 33 formed in the driven plates 23 defining a sealed chamber in the fluid housing 35.

Figure 3:
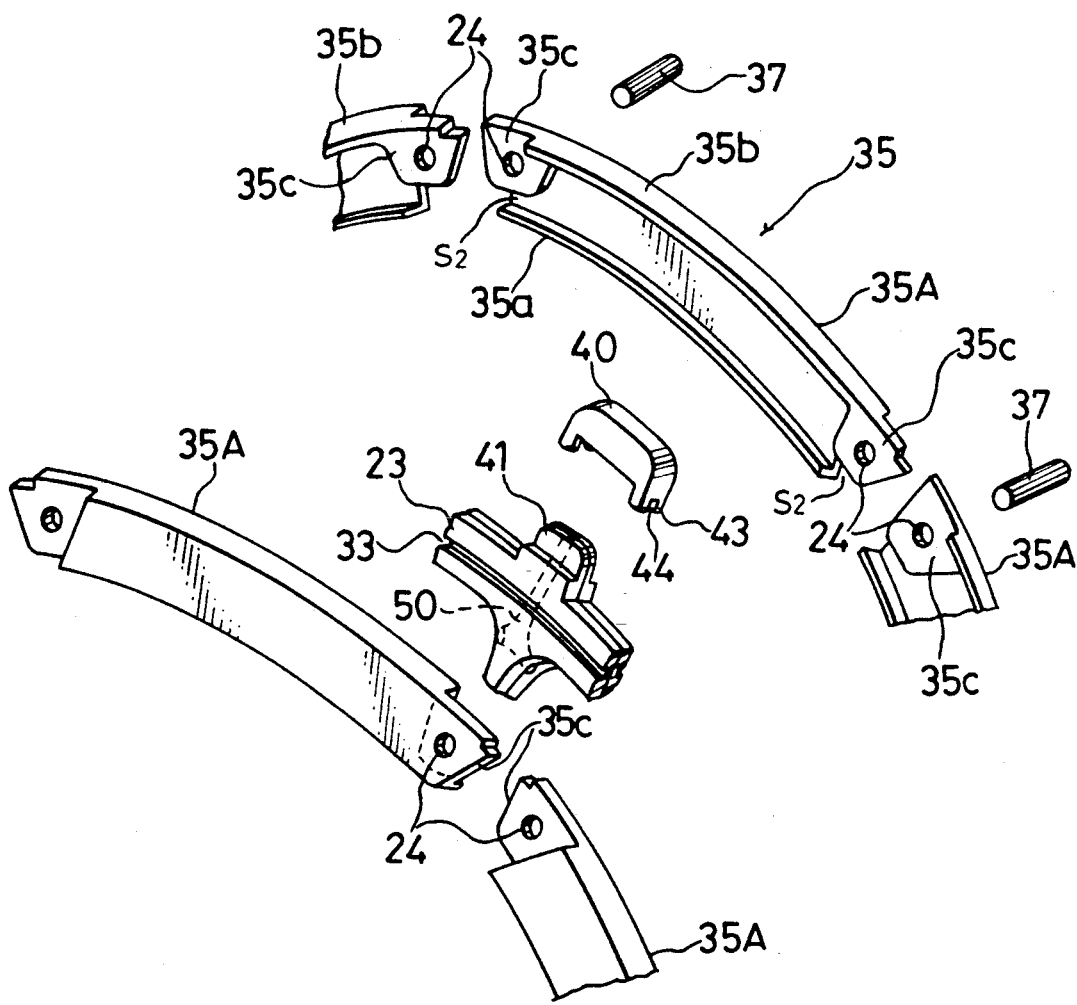
FIG. 3 is an exploded-perspective view showing a portion of a fluid housing.

The fluid housing 35 can be divided into two parts in the axial direction and five parts in the circumferential direction, partially represented by FIG. 3. That is, the fluid housing 35 consists of a total of 10 substantially sectorial housing members 35A. The tabs 35c have holes 24 and are formed in the circumferentially opposing ends of each housing member 35A. The complementary tabs 35c of the adjacent housing members 35A are overlapped with each other and connected to each other by pins 37, so that the fluid housing 35 is composed in an annular configuration.

Since the fluid housing 35 is thus structured, as in the foregoing, the radially interior portion of the fluid chamber in the fluid housing 35 is sealed by fitting the annular projections 35a into the annular grooves 33 in the driven plates 23. Thus both the axial ends, of the damping portion, and the periphery of the fluid chamber are enclosed by the walls of the fluid housing 35.

A slider 40 is slidably disposed in the circumferential direction within the fluid housing 35. The slider 40 is formed as a cap which opens radially inwardly, and its outer peripheral surface in the radial direction is arcuate to conform to the inner surface of the peripheral wall 35b of the fluid housing 35. Leg portions 43 protrude at each of the four corners of the open end of the slider 40, thus providing fluid passage 44 between opposite pairs of the leg portions 43. The leg portions 43 of the slider 40 are slidably located on the peripheral composite edge of the driven plates 23.

Projections 41 are formed on the composite periphery of the driven plates 23 and project radially outward. Each projection 41 projects into a slider 40. The circumferentially opposite walls of each slider 40 form stops 40a which are circumferentially spaced apart from the projection 41 by, for example, angles of $\theta 1$ and $\theta 2$ respectively when the engine is at rest (FIG. 2). The projection 41 divides the space inferior of the slider 40 into a first subcompartment 71 in its forward portion and a second subcompartment 70 in its rear portion in the direction of rotation R, and makes a subchoke S2 whereby the subcompartments 70 and 71 communicate along the inner surface of the slider 40.

Main chokes S1 whereby adjacent compartments 38 and 39 communicate are formed between the concave inner surface of the tabs 35c and the peripheral composite edge of the driven plates 23. Clearance d2 of main choke S1 is smaller than that of clearance d1 of the subchoke S2. In other words, the flow-sectional area of the subchoke S2 is greater than that of the main choke S1.

Fluid compensation paths 50 are formed between the walls of the driven plates 23. Each fluid path 50 opens out toward a slider 40 in the radially outer edge of the projection 41, as shown in FIG. 3. The fluid path 50 extends radially inward from this opening and branches in two toward the apertures 25 and 26, opening into them.

Description will now be made of the operation of the viscous fluid damper disc.

Figure 5:
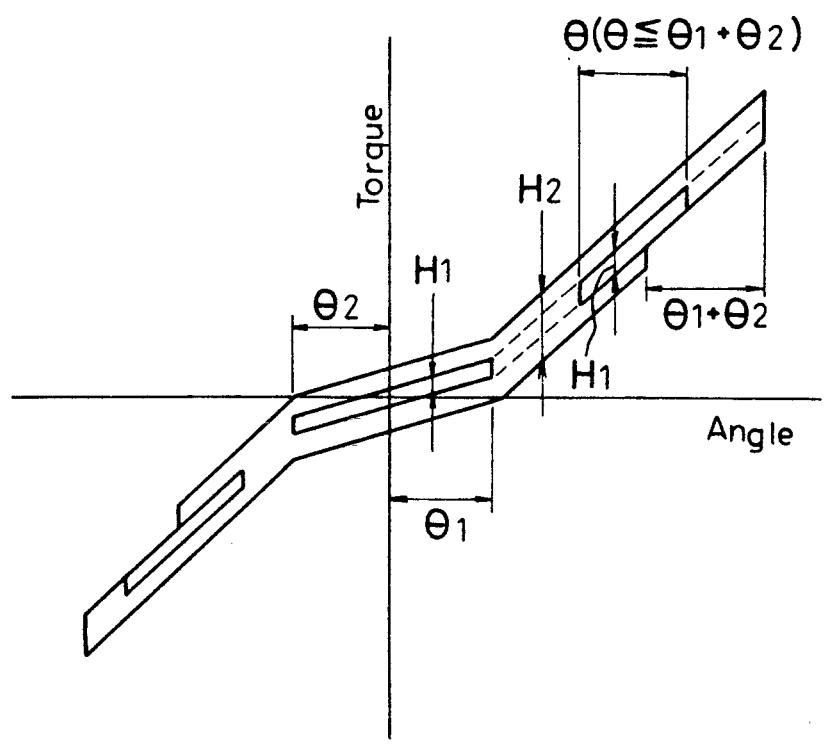
FIG. 5 is a graph showing torsional characteristics according to the embodiments.
Figure 6:
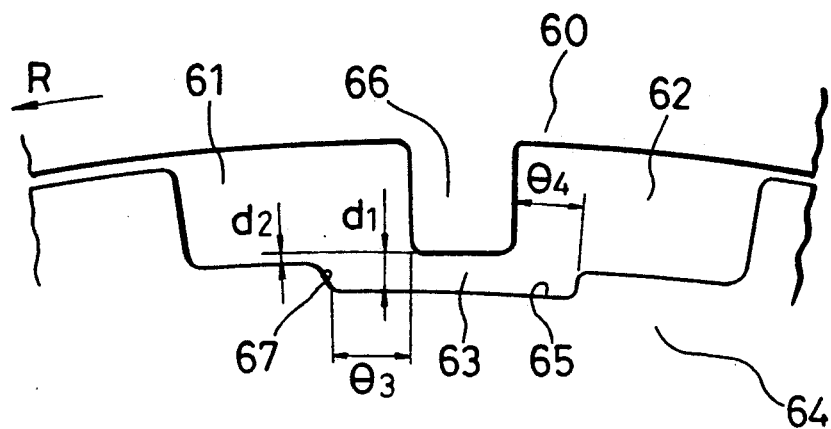
FIG. 6 is a view showing a conventional example, which corresponds to FIG. 2.
Figure 7:
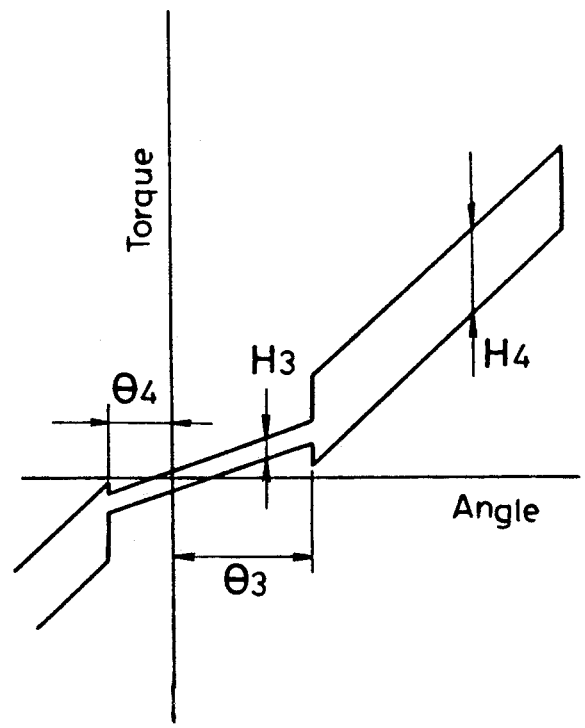
FIG. 7 is a graph showing torsional characteristics of the conventional example shown in FIG. 6.

When torsional torque is generated, the drive plate 3 rotates forward or backward relative to the direction of rotation of the driven plates 23. Initially, under small-angle torsion (for example, under a torsion of angle $\theta 1$ or of angle $\theta 2$ as indicated in FIG. 5), the coil springs 30 are compressed such that their biased ends just meet the adjacent walls of the apertures 25 wherein the viscous-fluid disc damper provides low-torsion rigidity. As the angle of torsion increases, the coil springs 30, are compressed such that their ends abut the end faces of the apertures 25, wherein the viscous-fluid disc damper provides high-torsion rigidity.

Following is a description of the generation of hysteresis torque due to the flow of fluid caused by changes in torsional torque.

Given the state wherein the projection 41 is not abutting against either of the stop portions 40a of the slider 40, as shown in FIG. 2, and that the drive plate 3 rotates in, for example, the direction R relative to the driven plates 23, then, the housing 35 and the slider 40 move in union in the direction R. Consequently, the second subcompartment 70 is compressed whereby its volume is reduced, and at the same time, the first subcompartment 71 is enlarged whereby its volume is increased. As a result, the fluid flows mainly from the second subcompartment 70 into the first subcompartment 71 through the subchoke S2. In this instance, since the flow-sectional area of subchoke S2 is large, the resistance of the passage is small. Consequently, the hysteresis torque H1 (see FIG. 5) generated is low.

When the angle of torsion becomes so great that the stop portion 40a of the trailing-end wall of the slider 40 with respect to the direction R contacts the projection 41, the subchoke S2 is closed due to the cutoff of the associated fluid passage 44, and the slider 40 then moves in conjunction with the projection 41. The drive plate 3 and the housing 35 move forward in the direction R of the driven plates 23 and the slider 40. Consequently, fluid in the second compartment 39 flows reverse of the direction R into the first compartment 38 through the main choke S1, and also flows forward in the direction R into the first compartment 38 due to the gapping between the outer surface of the slider 40 and the housing 35. In this instance, since the flow-sectional area of the main choke S1 is small, high fluid resistance thereby obtains. Consequently, the hysteresis torque H2 (see FIG. 5) generated is high.

As the drive plate 3 reverts after a forward rotation as described above, the stop portion 40a of the trailing-end wall of the slider 40 first separates from the projection 41, so that the subchoke S2 is operative. Fluid then flows mainly from the first subcompartment 71 into the second subcompartment 70 through the subchoke S2 when the torsional angles falls in the range of θ1 plus θ2 (see FIG. 5). Consequently, the hysteresis torque H1 generated is low.

When small torque fluctuations occur due to, for example, combustion vibration wherein the drive plate 3 is twisted at an angle relative to the driven plate 23, the slider 40 will reciprocate within the range of the torsional angles θ1 plus θ2. Consequently, the subchoke S2 functions such that the hysteresis torque H1 is generated is low.

Accordingly, as in the foregoing description, the hysteresis torque varies not by the absolute torsional angle of the drive plate 3 relative to the driven plate 23 but by the operational angle, i.e., the positional relation between the slider 40 and the projection 41.

During the aforedescribed operation, an amount of the fluid in the housing 35 may leak out slightly from a sealed portion of the annular projection 35a. In this case, however, compensating fluid is supplied from the apertures 25 and 26 to the slider 40 through the fluid path 50 by centrifugal force, thereby preventing degradation of the hysteresis torque characteristics due to fluid decrease in the housing 35.

Figure 4:
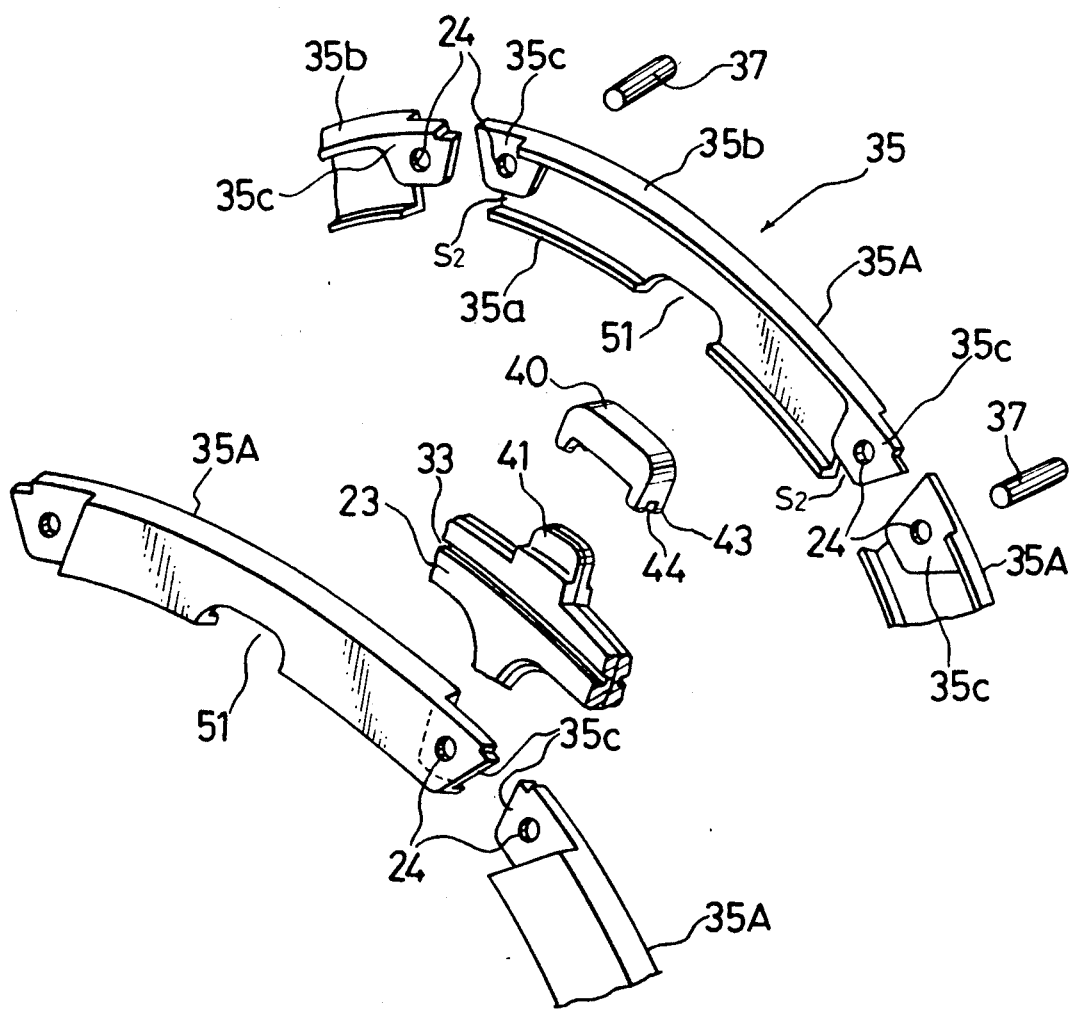
FIG. 4 is a view showing another embodiment according to the present invention, which corresponds to FIG. 3.

OTHER EMBODIMENTS (1) FIG. 4 shows another embodiment according to the present invention.

A pair of notches 51 for fluid compensation are formed on both sides of the fluid housing 35, in lieu of the fluid path 50 within the driven plates 23. The notches 51 are formed midway between neighboring main chokes S1, and are configured to open toward the central axis.

Fluid can be supplied by centrifugal force into the fluid housing 35 through the fluid notches 51 for compensation. However, the construction shown in FIG. 2 is more advantageous, since fluid may leak out of the fluid housing 35 through the fluid notches 51 when the rotational speed is low and the centrifugal force is small.

(2) The coil spring 30 may be replaced with a damper which utilizes the viscosity of a fluid medium.

(3) The present invention is also applicable to, for example, a damper disc having two-stage torsional characteristics wherein strong and weak coil springs are provided, or a damper disc having three-stage torsional characteristics wherein three kinds of coil springs are provided.

Although the present invention has been described and illustrated in detail, it is clearly understood that the same is by way of illustration and example only, and is not to be taken by way of limitation, the spirit and scope of the present invention being limited only by the terms of the appended claims.

What is claimed is:

1. A viscous-fluid disc damper comprising:
   a drive plate defining a containing space;
   a driven plate coaxially disposed within said containing space; and
   a damping mechanism, disposed between said plates, employing a viscous fluid medium for absorbing torsional torque, wherein said damping mechanism, in response to operational angular movement of said drive plate and said driven plate relative to each other, produces viscous resistance variable in dependency on said operational angular movement, independently of a relative positional angle of said drive and said driven plates to each other;
   said damping mechanism comprises a first viscous-damping means which generates low viscous resistance in response to small-angle operational angular movement, and a second viscous-damping means which generates a high viscous resistance in response to large-angle operational angular movement, independently of said positional angle.

2. A viscous-fluid disc damper according to claim 1 wherein
   said first viscous-damping means comprises first and second fluid containing chambers and a first choke portion by which said first and second fluid containing chambers communicate, wherein the respective volumes of said fluid-containing chambers vary reciprocally according to changing torsion between said plates, and
   said second viscous-damping means comprises third and fourth fluid containing chambers and a second choke portion by which said third and fourth fluid containing chambers communicate, wherein the volumes of said fluid-containing chambers vary reciprocally according to changing torsion between said plates.

3. A viscous-fluid disc damper according to claim 2 further comprising a first flywheel connected to said drive plate, and a second flywheel connected to said driven plate.

4. A viscous fluid damper disc according to claim 3 further comprising a clutch connected to said second flywheel.

5. A viscous fluid damper disc according to claim 4, wherein said clutch comprises a clutch cover fixed to the second flywheel and a clutch disc concentrically disposed within said clutch cover.

6. A viscous-fluid disc damper according to claim 5, wherein said driven plate and said second flywheel engage each other by serrated teeth.

7. A viscous-fluid disc damper according to claim 1 wherein said damping mechanism further comprising a fluid compensation mechanism having fluid containing chambers, a fluid storage disposed within said fluid containing chambers, and a communication between said fluid storage and said fluid containing chambers.

8. A viscous-fluid disc damper according to claim 7 further comprising at least one elastic member for elastically connecting said drive plate and said driven plate, wherein said driven plate has at least one aperture at said fluid storage, and said elastic member is disposed in said aperture.

9. A viscous fluid damper according to claim 8, wherein said elastic member is a coil spring having ends abutting against circumferentially-facing walls of said aperture at a bias when said damper disc is in a free state.

10. A viscous-fluid disc damper as recited in claim 1, wherein said damping mechanism disposed between said plates for absorbing torsional torque has a fluid housing provided in a peripheral portion of said drive plate and opening radially outward, at least one choke projection provided on the periphery of said driven plate and projected into said fluid housing, at least one slider slidably located in said fluid housing and covering said choke projection, and at least one choke tab in said fluid housing.

11. A viscous-fluid disc damper according to claim 10, wherein said choke tab has a flow passage smaller than that of said choke projection.

12. A viscous-fluid disc damper according to claim 11, wherein said slider is in a form of a cap opening radially inwardly and having a radially outer arcuate surface.

13. A viscous-fluid disc damper according to claim 12, wherein said slider further has fluid passages in its circumferentially opposed ends.

14. A viscous-fluid disc camper according to claim 13, wherein said fluid housing comprises a plurality of housing members arranged angularly, said housing members each having a connecting portion in its circumferentially opposed ends, and connecting members for connecting adjacent connecting portions.

15. A viscous-fluid disc damper according to claim 14, wherein said choke tab is composed of said connecting portions.

16. A viscous-fluid disc damper according to claim 15, wherein said fluid housing has annular projections projecting from its radially interior edge and said driven plate has, in its periphery, annular grooves into which said annular projections are fitted.

17. A viscous-fluid disc damper according to claim 16 which further includes a fluid compensation mechanism having a fluid storage disposed within said fluid housing, and a communication between said fluid storage and said fluid housing.

18. A viscous-fluid disc damper according to claim 17 which further includes an elastic member for elastically connecting said drive plate and said driven plate, wherein said driven plate has at least one aperture at said fluid storage, and said elastic member is disposed in said aperture.

19. A viscous-fluid disc damper according to claim 18, wherein said elastic member is a coil spring having ends abutting against circumferentially-facing walls of said aperture at a bias when said damper disc is in a free state.

20. A viscous-fluid disc damper according to claim 19 further comprising a first flywheel fixed to said drive plate, and a second flywheel fixed to said driven plate.

21. A viscous-fluid disc damper according to claim 20 further comprising a clutch connected to said second flywheel.

22. A viscous-fluid disc damper according to claim 21, wherein said clutch comprises a clutch cover fixed to said second flywheel and a clutch disc arranged in said clutch cover.

23. A viscous-fluid disc damper according to claim 22, wherein said driven plate and said second flywheel engage each other by serrated teeth.

24. A viscous-fluid disc damper comprising:
a drive plate having a containing space;
a driven plate disposed in said containing space;
a viscous-damping mechanism disposed between said plates for absorbing torsional torque, and having a pair of fluid containing chambers the volumes of which are changed by the torsion between said plates, and a choke portion by which said chambers communicate; and
a fluid compensation mechanism having a fluid storage arranged within said fluid containing chambers, and a communication between said fluid storage and said fluid containing chambers.

25. A viscous-fluid disc damper according to claim 24, wherein said communication is formed in said driven plate.

26. A viscous-fluid disc damper according to claim 25 which further comprising an elastic member for elastically connecting said drive plate and said driven plate, wherein said driven plate has at least one aperture as said fluid storage, and said elastic member is disposed in said aperture.

27. A viscous-fluid disc damper according to claim 26, wherein said elastic member is a coil spring having ends abutting against circumferentially-facing walls of said aperture at a bias when said damper disc is in a free state.

28. A viscous-fluid disc damper according to claim 27 further comprising a first flywheel fixed to said drive plate and a second flywheel fixed to said driven plate.

29. A viscous-fluid disc damper according to claim 28 further comprising a clutch connected to said second flywheel.

30. A viscous-fluid disc damper comprising:
a drive plate having a containing space;
a driven plate disposed in said containing space;
a viscous-damping mechanism disposed between said plates for absorbing torsional torque and having a fluid housing provided in the peripheral portion of said drive plate and opening radially outward, at least one choke projection provided on the outer periphery of said drive plate and projecting into said fluid housing, at least one slider slidably located in said fluid housing and covering said choke projection, and at least one choke tab formed in said fluid housing; and
a fluid compensation mechanism having a fluid storage arranged within said fluid housing, and a communication between said fluid storage and said fluid housing, said communication being formed in said choke projection and opens into said slider.

31. A viscous-fluid disc damper according to claim 30 further comprising elastic members for elastically connecting said drive plate and said driven plate, wherein said driven plate has apertures as said fluid storage, and said elastic members are disposed in said apertures.

32. A viscous-fluid disc damper according to claim 31, wherein said communication extends radially inward from said choke projection and branches, opening into said apertures.

33. A viscous-fluid disc damper according to claim 32, wherein said elastic members are coil springs, ends of which abut against circumferentially-facing walls, of said apertures at a bias when the damper disc is in a free state.

34. A viscous-fluid disc damper according to claim 33, wherein said choke tab provides a flow passage area which is smaller than that provided by said choke projection.

35. A viscous-fluid disc damper according to claim 34 further comprising a first flywheel fixed to said drive plate, and a second flywheel fixed to said driven plate.

36. A viscous-fluid disc damper according to claim 35 further comprising a clutch connected to said second flywheel.

37. A viscous-fluid disc damper according to claim 30, wherein said communication consists of a pair of notches formed in the sidewalls of said fluid housing.

38. A viscous-fluid disc damper according to claim 37 further comprising an elastic member for elastically connecting said drive plate and said driven plate, wherein said driven plate has at least one aperture as said fluid storage, and said elastic member is disposed in said aperture.

39. A viscous-fluid disc brake damper according to claim 38, wherein said elastic member is a coil spring having ends abutting against circumferentially-facing walls of said aperture at a bias when said damper disc is in a free stated.

40. A viscous-fluid disc damper according to claim 39, wherein said choke tab provides a flow passage area smaller than that provided by said choke projection.

41. A viscous-fluid disc damper according to claim 40 further comprising a first flywheel fixed to said drive plate, and a second flywheel fixed to said driven plate.

42. A viscous-fluid disc damper according to claim 41 further comprising a clutch connected to said second flywheel.

* * * * *